United States Patent [19]

Jenkins

[11] Patent Number: 5,186,281
[45] Date of Patent: Feb. 16, 1993

[54] METHOD FOR RETAIL CHECKOUT

[75] Inventor: Alfred D. Jenkins, Cambridge, Ohio

[73] Assignee: NCR Corporation, Dayton, Ohio

[21] Appl. No.: 712,835

[22] Filed: Jun. 10, 1991

[51] Int. Cl.$^5$ .............................................. E04H 3/00
[52] U.S. Cl. ......................................... 186/55; 235/383
[58] Field of Search .................... 186/36, 53, 55, 56; 235/381, 383, 385

[56] References Cited

U.S. PATENT DOCUMENTS

| | | | |
|---|---|---|---|
| 2,679,354 | 5/1954 | Skillman | 186/55 X |
| 3,023,851 | 3/1962 | Stiller . | |
| 3,532,184 | 10/1970 | Blake | 186/56 |
| 3,716,697 | 2/1973 | Weir | 186/56 X |
| 3,741,345 | 6/1973 | Saridis | 186/56 |
| 3,746,130 | 7/1973 | Bullas | 186/56 |
| 3,824,544 | 7/1974 | Simjian | 186/56 X |
| 3,931,497 | 1/1976 | Gentile et al. . | |
| 4,073,368 | 2/1978 | Mustapick | 186/53 |
| 4,199,100 | 4/1980 | Wostl et al. | 235/381 |
| 4,395,627 | 7/1983 | Barker et al. | 235/381 |
| 4,550,246 | 10/1985 | Markman | 235/385 |
| 4,569,421 | 2/1986 | Sandstedt | 186/39 |
| 4,638,312 | 1/1987 | Quinn et al. | 235/383 X |
| 4,675,515 | 6/1987 | Lucero | 235/381 |
| 4,676,343 | 6/1987 | Humble et al. | 186/61 |

Primary Examiner—F. J. Bartuska
Attorney, Agent, or Firm—Albert L. Sessler, Jr.

[57] ABSTRACT

A method and system for article selection and purchase in a retail establishment utilizes customer selection of articles from a plurality of display panels displaying samples of the articles. Information including customer identity, article selection and article quantity is provided to the system by entry devices on the display panels. A record of customer selections is generated at a precheck terminal using this information, which is also used to transport the selected articles from a product stocking area to an order accumulation area, where a record is made of the accumulated articles. The two records are compared at a finalizing terminal, where customer payment is received and the purchased articles are delivered to the customer.

4 Claims, 6 Drawing Sheets

METHOD FOR RETAIL CHECKOUT

BACKGROUND OF THE INVENTION

This invention relates to a method and system for retail checkout of purchased articles, and more particularly relates to such a method and system in which such articles are selected by customers from a display of samples of such articles, automatically retrieved from a product stocking area, placed in an article accumulating area, and provided to the customers after pre-check and finalizing check-out operations.

Efficient utilization of space, protection against shoplifting, avoidance of congestion arising from use of grocery carts in narrow aisles, rapid customer service and reduction in the number of required employees are all concerns that are relevant with respect to supermarkets and other types of self-service retail establishments. The conventional arrangement of a supermarket, in which customers move through aisles between shelves stocked with articles selected by customers and conveyed by grocery carts to checkout stations, provides problems in many of these areas. Arrangements have previously been suggested in which customers select articles for purchase from displayed samples, and the selected articles are taken from a supply area and provided to the customer. Various systems have been proposed to facilitate customer selection of articles, communication of the selection to the supply area and transportation of selected articles from the supply area to a station for delivery to the customer and receipt of payment from the customer. Representative systems are shown in U.S. Pat. No. 3,023,851, to Bruno V. Stiller; U.S. Pat. No. 3,532,184, to Morton Blake; and U.S. Pat. No. 3,741,345, to Harry Siridis.

SUMMARY OF THE INVENTION

In the present invention, selection of articles to be purchased is accomplished by a customer selecting an article from a sample display using a selection system related to the coordinate position of the sample in a display, indicating the desired quantity of the selected article through another selection system, and providing identification by use of a credit card or similar device. The selected articles are then taken from a central supply area and moved to an accumulation area. A record of the items selected and their cost is obtained at a pre-check station and the articles are finally checked out at a checkout station.

In accordance with one embodiment of the invention, a method of selecting and checking out merchandise in a retail establishment comprises the following steps: (a) providing identification by a customer; (b) viewing samples of items in a display area by the customer; (c) entering the selection of a desired item by a selection means associated with the display area; (d) entering the selection of the touch screen desired of said selected item by a quantity associated with the display area; (e) repeating steps (c) and (d) if additional items are desired; (f) performing a pre-check operation by or for the customer; (g) receiving by the customer of an itemized, totaled receipt for items purchased with identification number and account verification; (h) retrieving of selected items from a product stocking area and assembling them in an item accumulating area; (i) checking out by the customer at a checkout station; and (j) receiving by the customer of the purchased items.

In accordance with another embodiment of the invention, a method of selecting and checking out merchandise in a retail establishment, said area having individual area having individual display compartments for displaying actual samples of items to be sold, selection means employing vertical and horizontal values associated with rows and columns of said compartments in the display area for identifying the customer selecting the items, quantity means for entering the quantity desired of each selected item, pre-check means for producing a record of the items and quantity of items selected, a product stocking area for storing the items to be sold, an item accumulating area, means for retrieving items ordered by the customer from the product stocking area and placing them in location in the item accumulating area in accordance with the customer identification, and a checkout station for checking out the items accumulated, comprises the following steps: (a) providing identification to the system by a customer by applying a customer card to said ID means; (b) viewing the samples in the display area by the customer; (c) selecting the desired item by using said selection means to index values corresponding to those associated with said compartments; (d) selecting the quantity desired of said selected items by entering a numerical value into said quantity means; (e) repeating steps (c) and (d) if additional items are desired; (f) removing said customer card from said ID means; (g) performing a pre-check operation by or for the customer at the pre-check means; (h) receiving by the customer from the pre-check means of an itemized, totaled receipt for items purchased with identification number and account verification; (i) retrieving of selected items by the retrieving means from the product stocking area and assembling them in the item accumulating area; (j) checking out by or for the customer at said checkout station, and (k) receiving by the customer of the purchased items form the item accumulating area.

It is accordingly an object of the present invention to provide an improved method for selection and purchase of articles by a customer in a retail establishment.

Another object is to provide an improved process for enabling the automated purchase of selected articles from an establishment.

Another object is to provide a method of selecting and purchasing articles from a retail establishment, which includes selection by the customer of the articles to be purchased from a display of samples of such articles, obtaining by the customer of a receipt identifying the purchased articles, movement of the articles purchased by the customer from a storage area to an accumulation area, and obtaining the purchased articles by the customer from the retail establishment in a checkout operation.

With these and other objects, which will become apparent from the following description, in view, the invention includes certain novel features of construction and combinations of parts, a preferred form or embodiment of which is hereinafter described with reference to the drawings which accompany and form a part of this specification.

DETAILED DESCRIPTION

Figure 1:
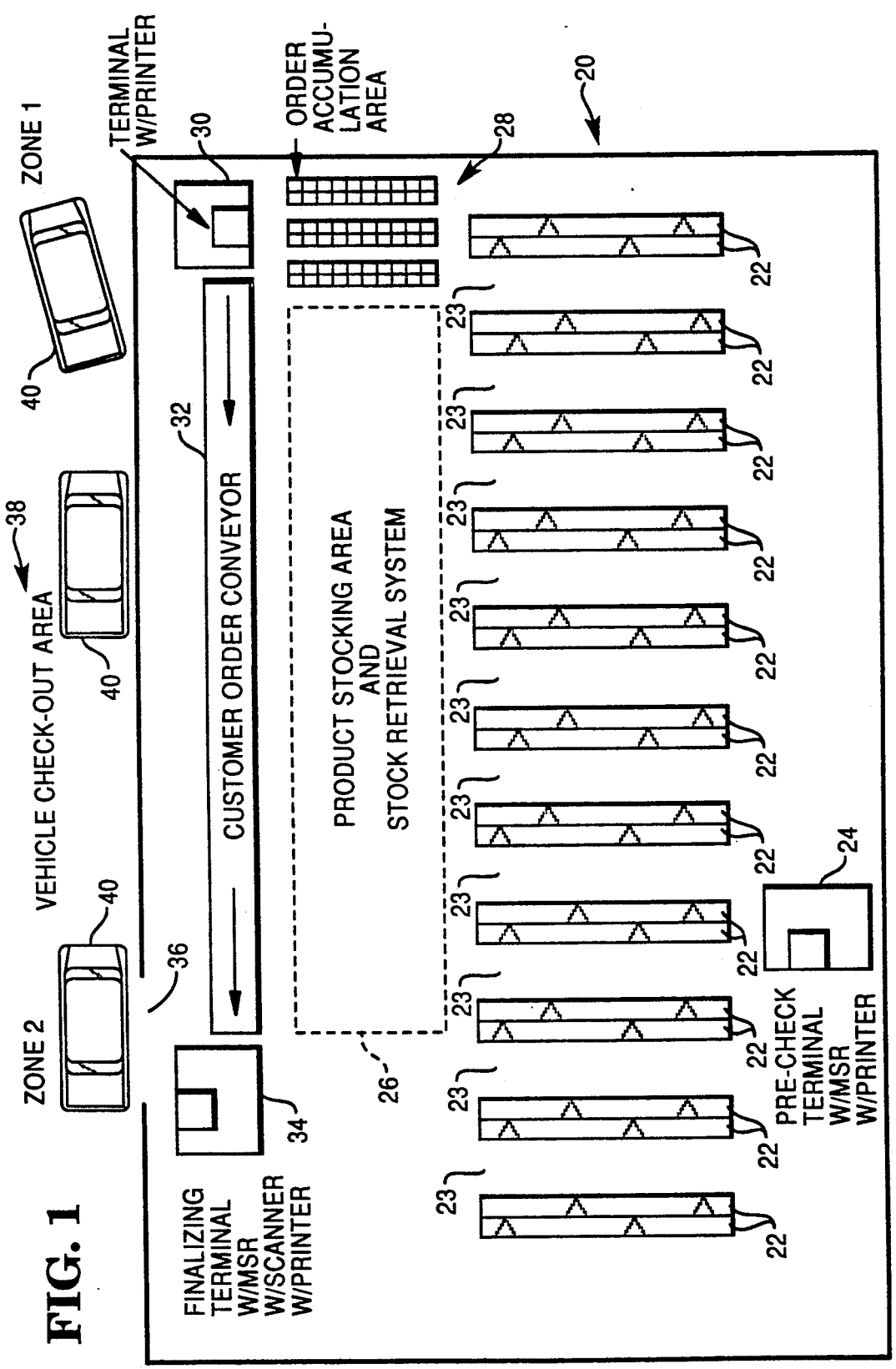
FIG. 1 is a diagrammatic plan view of the retail checkout system of the present invention.

Referring now to the diagrammatic plan view of FIG. 1, a facility such as a retail establishment 20 has situated therein a plurality of display panels 22, arranged in pairs, from which customers can select articles which they desire to purchase. The pairs of display panels 22 are separated by a plurality of aisles 23. The establishment 20 also includes a pre-check terminal station 24, a product stocking area 26, an order accumulation area 28, a terminal station 30 associated with the accumulation area 28, a customer order conveyor 32, a finalizing terminal 34 and an opening 36 for entry to and egress from the establishment 20. Outside and adjacent to the establishment 20 is a vehicle check-out area 38 through which automobiles 40 may move from a first area designated as "zone 1" to a second area designated as "zone 2". In "zone 1", an employee on foot carrying a wireless transceiver communicates the order of customer queuing to another employee, who also has a wireless transceiver, at the terminal station 30 in the accumulation area 28. This assures that customers are attended to on a "first arrived, first served" basis, as they approach "zone 1" in their vehicles.

Figure 2:
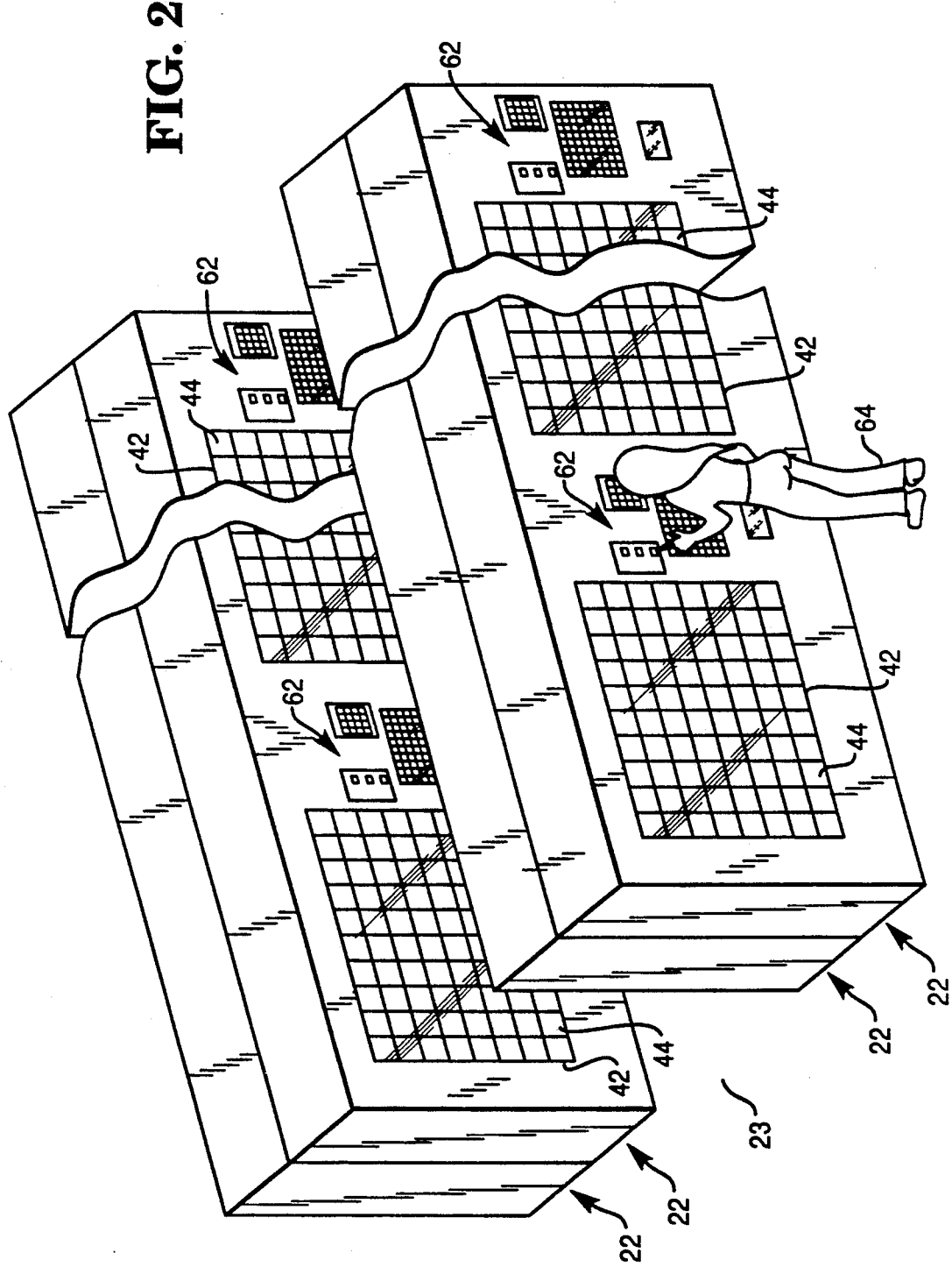
FIG. 2 is a perspective view showing two of the display panels of the system and a customer aisle between them.
Figure 3:
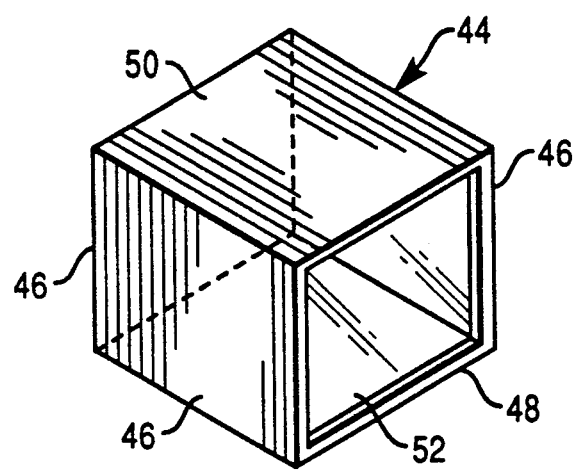
FIG. 3 is a perspective view of one of the individual display containers of the display panel, in which a sample of an individual item can be displayed.
Figure 4:
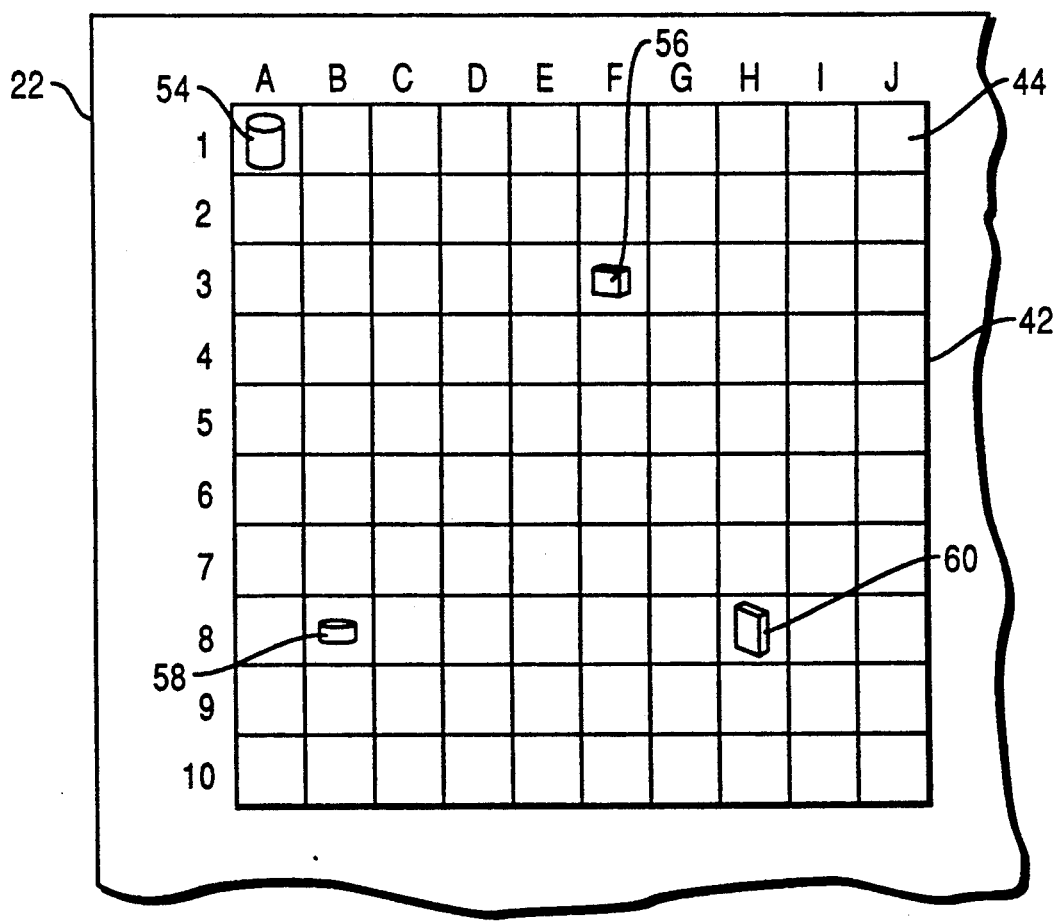
FIG. 4 is a fragmentary elevation view of the display containers of a display panel, showing a coordinate addressing arrangement by which any of the individual containers can be identified.

Four of the display panels 22, arranged in pairs with a separating customer aisle 23 therebetween, are shown in perspective in FIG. 2. The panels 22 are drawn with breaks therethrough, in order to indicate that they may vary in length and in the number of articles displayed in a given panel, in accordance with the available floor area and merchandise requirements of a given establishment. As shown in FIG. 2, each display panel 22 includes at least one, and commonly two or more display areas 42. Each display area 42 comprises a plurality of individual containers 44 which have an outer transparent door 52 to enable articles to be placed therein, removed therefrom, and viewed by a customer when located within the container 44. As shown in greater detail in FIG. 3, each container 44 comprises three sides 46, a bottom surface 48, a top surface 50 and a transparent door 52. A plurality of containers 44 are packaged together in a matrix configuration to form a display area 42, as shown in FIG. 4. Articles available for purchase are positioned within the various containers, as represented by articles 54, 56, 58 and 60. The location or address of a given container may be specified by use of a coordinate addressing scheme which employs numerical values (1 to 10 in FIG. 4) disposed vertically along the left side of the display area 42 and alphabetic values (A-J in FIG. 4) disposed horizontally along the top of the display area 42. Thus the article 54 is located by the address A-1; the article 56 is located by the address F-3; the article 58 is located by the address B-8; and the article 60 is located by the address H-8.

Figure 5:
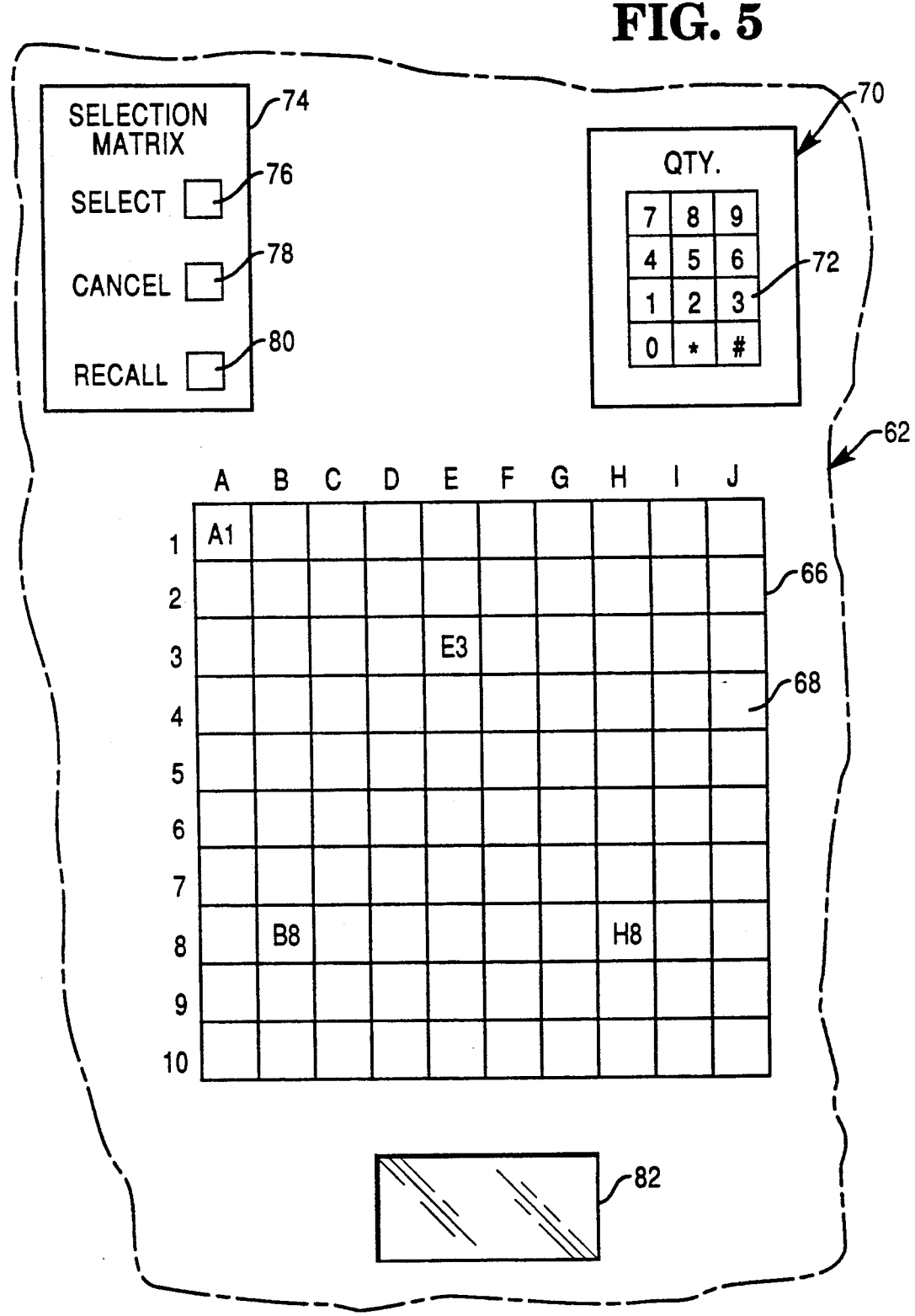
FIG. 5 is a fragmentary elevation view of that portion of a display panel which includes the various customer-operated selection and identification elements.

Shown in FIG. 5 is a control section 62 which is associated with each display area 42. A customer 64 is shown in FIG. 2 using a control section 62 associated with a display area 42.

The control section 62 includes a data entry device such as a keyboard or touch screen 66 which essentially duplicates the alpha-numeric arrangement associated with each display area 42, with the numerical values arranged vertically along the left side of the keyboard 66, and the alphabetical values being arranged horizontally along the top of the keyboard. The various keys or touch screen areas 68 which must be pressed to select the articles 54, 56, 58 and 60 of FIG. 4 are identified in FIG. 5 by their letter-number address.

It will be seen that, if desired, a different type of entry device than that shown in FIG. 5 could be used. For example, an arrangement could be used in which two keypads are employed, one bearing the numbers 1 to 10 and the other bearing the letters A to J. A desired address could then be indicated by pressing one appropriate key in each pad. This would have the advantage of requiring a smaller total number of keys.

Located above and to the right of the keyboard 66 is a smaller keyboard, key pad or touch screen 70 which, in the illustrated embodiment, includes twelve keys or areas 72 comprising the digits zero to 9, and two symbol keys. This key pad is used by the customer to enter into the system the quantity desired of the article selected.

Also above the keyboard 66 and to the left thereof as viewed in FIG. 5 is a small panel 74 bearing three keys 76, 78 and 80. These keys are used to control the type of transaction to be performed. Thus the customer depresses the select key 76 to cause a selection operation to take place. If it is desired to cancel an operation, the key 78 is depressed, and if it is desired to recall a previous operation for review or alteration, the key 80 is depressed.

Located below the keyboard 66 is a magnetic stripe reader 82 which is used by a customer to enter identification information, such as an account number, into the system in association with the transaction of selecting one or more articles from the display area 42 and entering the desired quantity of each into the key pad 70. This identification information may be taken from any appropriate type of customer card, such as a credit card, a debit card, or a special card issued by the establishment. Customarily the desired information would be sensed from a magnetic stripe on the card, but optical or other sensing could also be used if appropriate.

Referring back to FIG. 1, the information associated with each article selection, including the identification of the article, the quantity desired, and the customer ID, will be transmitted by suitable means, such as an RS485 transmit/receive system, within the system to a pre-check terminal such as the terminal 24 and to the product stocking area 26. When the customer has selected all of the articles desired, by visiting all appropriate display panels 22, he or she then proceeds to the terminal 24, where an employee of the establishment will provide a receipt including all of the details relating to all of the items selected.

The transmission of information will also control the stock retrieval system in the product stocking area 26 to cause the selected articles to be taken from the stocking area 26 and moved to an appropriate receptacle 88 in the order accumulation area 28. The selected articles could, if desired, be moved manually by employees of the establishment, but additional efficiency may be achieved if some automated system is employed, such as a system utilizing suitable industrial robots.

Figure 6:
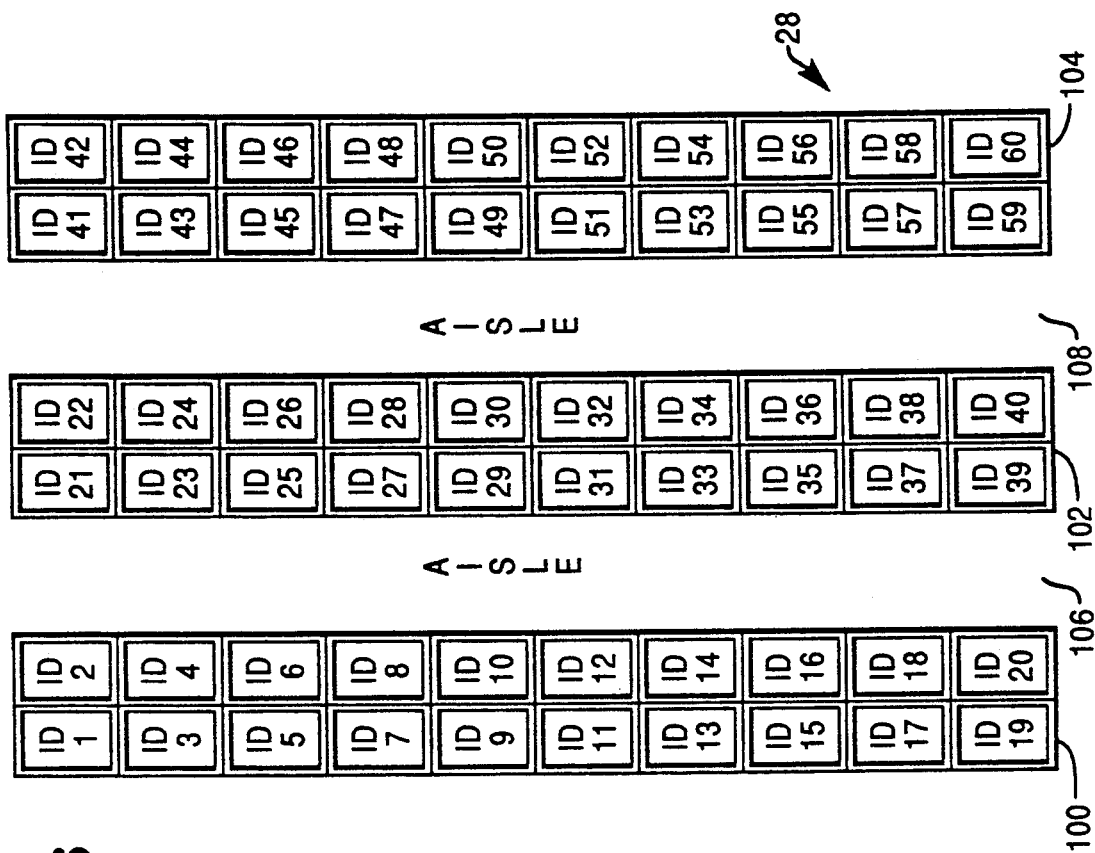
FIG. 6 is a diagrammatic plan view of the accumulation area of the system of the present invention, also including an enlarged perspective view of one of the containers in which items purchased by a particular customer are placed.
Figure 7:
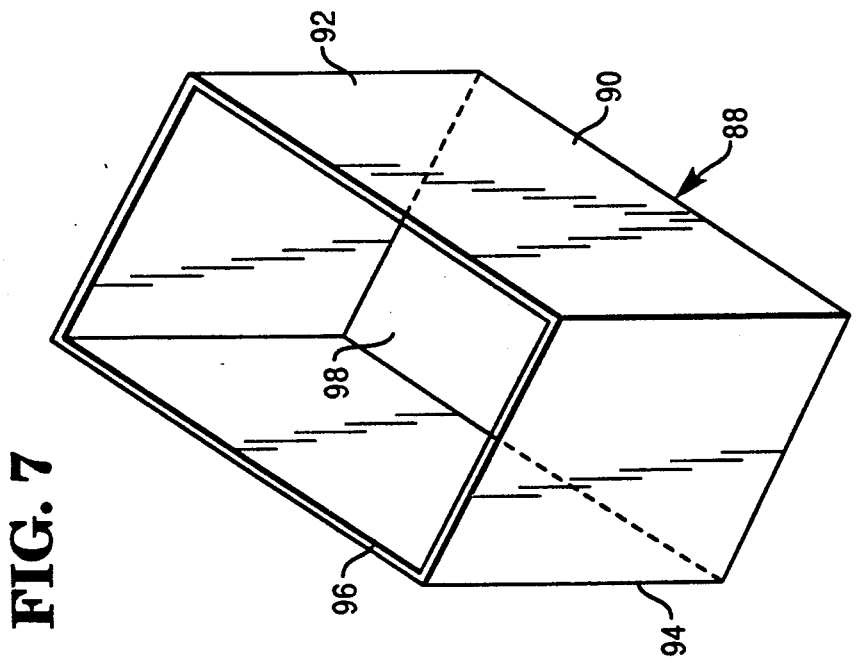
FIG. 7 is a perspective view of one of the containers used in the accumulation area of FIG. 6.

Shown in FIG. 6 is a more detailed view of the order accumulation area 28. Each receptacle 88 (FIG. 7) may take the form of an open container having sides 90, 92, 94, 96 and a bottom 98, and is of a size to accommodate a number and size of articles which might be purchased by a customer on a typical shopping trip. Each receptacle 88 is identified by an identification code so that it can be associated with a customer account. In the illustrated embodiment shown in FIG. 6, the receptacles bear identification codes ID1 to ID 60, and are arranged in three double rows 100, 102 and 104, with aisles 106 and 108 therebetween. This arrangement facilitates the movement of selected articles from the product stocking area 26 to the item accumulation area 28, and the placement of selected articles in the proper receptacle 88 for a given customer account.

Figure 8:
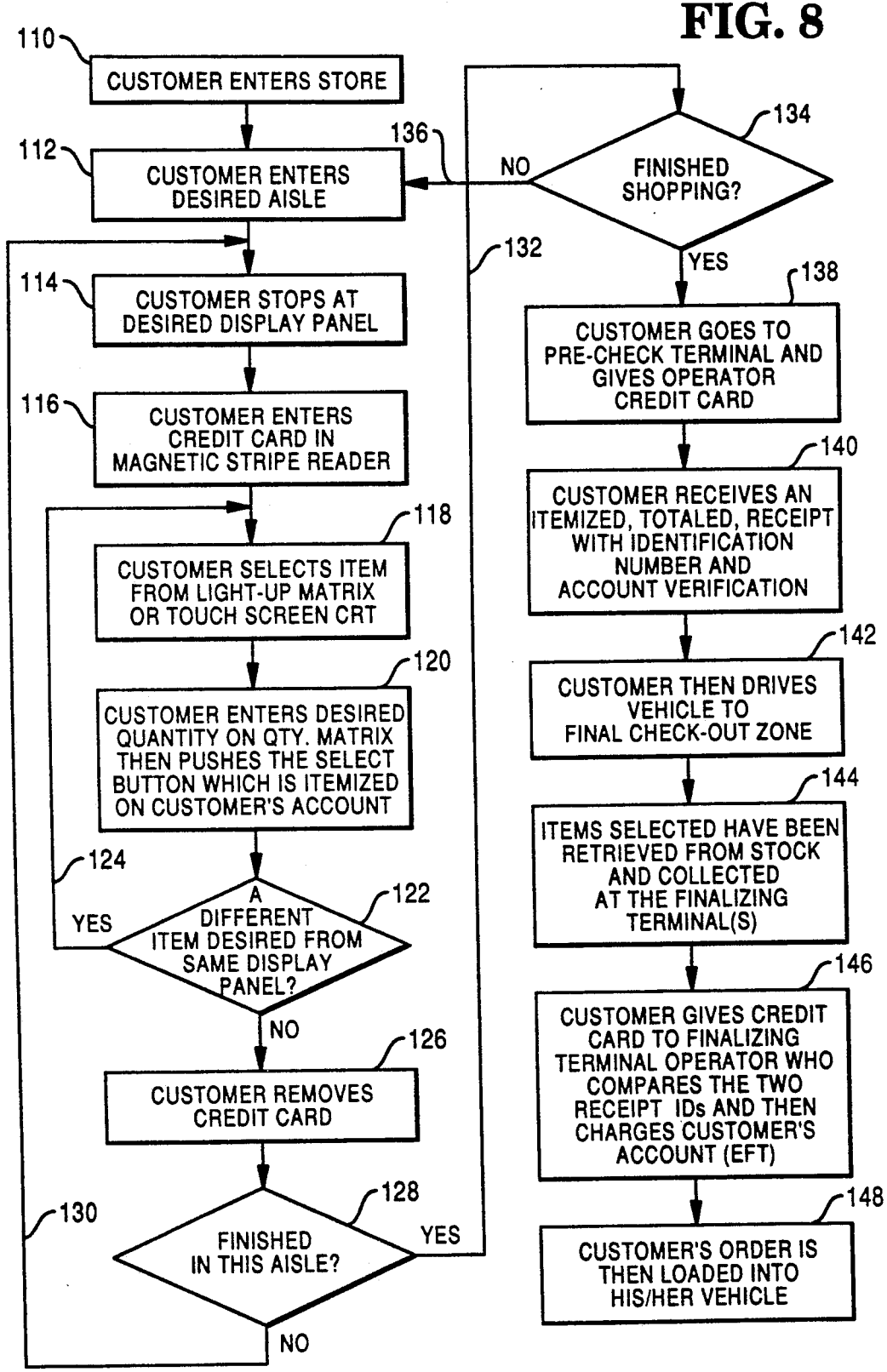
FIG. 8 is a flow diagram showing the process by which articles are selected, collected and purchased by a customer.

The process by which a customer makes purchases in the retail establishment 20 and receives the purchased items is illustrated in the flow diagram of FIG. 8. This process begins when the customer enters the store (block 110) and then proceeds to the desired aisle 23 (block 112), and stops at the desired display panel which contains the article which the customer wishes to purchase (block 114). The customer then enters his or her credit or other card in the magnetic stripe reader 82 (block 116) in order to provide an account number and identification which is used in association with the purchase to be made.

The customer then selects a desired one of the items displayed by using the keyboard or touch screen 66 to index a particular key or area corresponding to the location of the desired item in the display panel, as represented by block 118. Following this, the customer indicates the desired quantity by operating the key pad or touch screen 70, and then presses the select key 76, which causes the selected item and quantity to be itemized on the customer's account, as represented in block 120.

The customer then determines whether an additional item is desired from the same display panel, as represented by decision block 122. If so, the process returns via path 124 to blocks 118 and 120, so that additional selections can be made. If not, the customer removes the credit card from the MSR reader 82 (block 126).

A further determination is then made (block 128) as to whether all purchases of items displayed in that aisle have been made. If not, the process returns via path 130 to block 114, for further selection of items. If all desired purchases in the aisle have been made, the process continues via path 132 to a further decision block 134, where a determination is made as to whether shopping has been completed. If not, the process goes from block 134 via path 136 to block 112, where another aisle 23 of display panels 22 is entered for further shopping.

If shopping is completed, the customer proceeds to the pre-check terminal 24, as represented in block 138, and gives the terminal operator the previously used credit card. From the operator, the customer receives an itemized, totaled receipt with identification number and account verification, as represented in block 140. The information contained on the receipt is conveyed to the product stocking area 26, to enable the selected articles to be obtained, and to the finalizing terminal 34.

The customer then leaves the establishment 20 and drives his or her vehicle 40 from a parking or standing area (zone 1) to the final checkout zone (zone 2) in the vehicle checkout area 38, as represented in block 142. The customer then proceeds to the finalizing terminal 34. While the customer has been driving his or her vehicle to the final checkout zone and arriving at the finalizing terminal 34, the selected articles have been transported from the product stocking area 26 to one or more predetermined receptacles 88 in the order accumulation area 28, and a record of the accumulated articles has been printed by the terminal 30. The articles and the record of articles are then transported to the finalizing terminal 34 by means of the customer order conveyor 32, and in accordance with the customer queuing of incoming vehicles in "zone 1". The above activity is represented by block 144.

At the finalizing terminal 34, the customer gives his or her credit or other card to the operator of the finalizing terminal, who compares the receipt obtained by the customer from the terminal 24 with the record printed by the terminal 30. After determining that the two records compare properly, the operator charges the customer's account, whether it be a conventional credit card account or an electronic funds transfer account (block 146).

The customer's order is then loaded into his or her vehicle 40, completing the transaction, as represented in block 148.

While the forms of the invention shown and described herein are admirably adapted to fulfill the objects primarily stated, it is to be understood that it is not intended to confine the invention to the forms or embodiments disclosed herein, for it is susceptible of embodiment in various other forms within the scope of the appended claims.

What is claimed is:

1. A method of selecting and checking out merchandise in a retail establishment, said establishment including a system comprising a display area having individual display compartments for displaying actual samples of items to be sold, selection means employing vertical and horizontal values associated with rows and columns of said compartments in the display area for selecting items from the display area, ID means for identifying the customer selecting the items, quantity means for entering the quantity desired of each selected item, pre-check means for producing a record of the items and quantity of items selected, a product stocking area for storing the items to be sold, an item accumulating area, means for retrieving items ordered by the customer from the product stocking area and placing them in locations in the item accumulating area in accordance with the customer identification, and a checkout station for checking out the items accumulated, comprising the following steps:

(a) providing identification to the system by a customer by applying a customer card to said ID means;

(b) viewing the samples in the display area by the customer;

(c) selecting the desired item by using said selection means to index values corresponding to those associated with said compartments;

(d) selecting the quantity desired of said selected items by entering a numerical value into said quantity means;
(e) repeating steps (c) and (d) if additional items are desired;
(f) removing said customer card from said ID means;
(g) performing a pre-check operation by or for the customer at the pre-check means;
(h) receiving by the customer from the pre-check means of an itemized, totaled receipt for items purchased with identification number and account verification;
(i) retrieving of selected items by the retrieving means from the product stocking area and assembling them in the item accumulating area;
(j) checking out by or for the customer at said checkout station, and
(k) receiving by the customer of the purchased items from the item accumulating area.

2. The method of claim 1 in which step (a) comprises entry by the customer of a magnetically encoded customer card into said entry means.

3. The method of claim 1, in which the pre-check operation of step (e) includes the following steps:
(f1) totaling the customer account;
(f2) verifying the customer account; and
(f3) providing the customer with a listing of the order.

4. The method of claim 1, in which the retrieving and assembling of selected items in step (i) includes the placement of items for a given customer in a container reserved for the customer and identified by the customer identification.

* * * * *